United States Patent [19]
Alexander et al.

[11] Patent Number: 6,151,684
[45] Date of Patent: Nov. 21, 2000

[54] HIGH AVAILABILITY ACCESS TO INPUT/OUTPUT DEVICES IN A DISTRIBUTED SYSTEM

[75] Inventors: James R. Alexander; Jimmy R. Hill; Paul N. Hintikka, all of Austin, Tex.

[73] Assignee: Tandem Computers Incorporated, Cupertino, Calif.

[21] Appl. No.: 09/048,938

[22] Filed: Mar. 26, 1998

Related U.S. Application Data

[60] Provisional application No. 60/041,760, Mar. 28, 1997.

[51] Int. Cl.[7] ................................................ G06F 11/00
[52] U.S. Cl. .................................................. 714/4; 714/31
[58] Field of Search .................... 714/4, 2, 6, 7, 714/8, 10, 11, 25, 31, 43, 48, 5, 13, 30; 395/500.05, 500.46

[56] References Cited

U.S. PATENT DOCUMENTS

| | | | |
|---|---|---|---|
| 4,377,000 | 3/1983 | Staab | 371/11 |
| 4,627,054 | 12/1986 | Cooper et al. | 371/11 |
| 4,635,184 | 1/1987 | Schuss | 364/187 |
| 4,825,358 | 4/1989 | Letwin | 364/200 |
| 5,027,273 | 6/1991 | Letwin | 364/200 |
| 5,107,496 | 4/1992 | Cook et al. | 371/11.3 |
| 5,197,069 | 3/1993 | Cook et al. | 371/7 |
| 5,276,823 | 1/1994 | Cutts et al. | 395/575 |
| 5,327,553 | 7/1994 | Jewett et al. | 395/575 |
| 5,588,111 | 12/1996 | Cutts et al. | 395/182.07 |

*Primary Examiner*—Nadeem Iqbal
*Attorney, Agent, or Firm*—Townsend and Townsend and Crew LLP

[57] ABSTRACT

A system area network computer system architecture is structured as a single system image cluster operating system to offer an opportunity to increase the availability to I/O devices in the system. The computing system comprises a number of processor units coupled to a plurality of input/output (I/O) elements by a routing fabric that provides each of the processor elements with access to any one of the I/O elements. Using a Transparent Network Computing extension to a highly available version of UNIX System V Release 4.2, the system provides a higher degree of availability to I/O devices by providing for the takeover of their controlling entity.

13 Claims, 3 Drawing Sheets

HIGH AVAILABILITY ACCESS TO INPUT/OUTPUT DEVICES IN A DISTRIBUTED SYSTEM

This application claims the benefit of U.S. Provisional Application No. 60/041,760, filed Mar. 28, 1997, now abandoned, the disclosure of which is incorporated by reference.

BACKGROUND OF THE INVENTION

The present invention pertains generally to a multiple processor system, and more particularly to a multiple processor system that provides access to input/output devices in the face of a failure of a processor controlling the device.

Stock exchanges, banks, telecommunications companies, and other mission critical applications have relied on fault tolerant (FT) and highly available (HA) computer systems for many years. Downtime in these environments is extremely, costly and cannot be tolerated. As the reliance on computer systems for everyday activities continues to permeate our society and more services move on-line, twenty-four by seven operation and accessibility will become exceedingly important. For instance, consider Internet Service Providers (ISPs) and web servers. Users of ISPs and web servers demand continuous availability. Loss of availability translates directly to loss of revenue and loss of clientele. As a result, the demand for FT and HA computer systems is growing and will continue to grow. This growing demand will undoubtedly spawn a lot of research as industry and academia attempt to address availability issues. One such issue is the availability of I/O devices. In all the above mentioned examples, I/O plays a very important role. For example, a web server would be useless if it lost access to its network interfaces or disk controllers. Thus, in providing HA and FT solutions, the I/O devices must also be considered. Traditionally, in discussions of availability, the availability is centered around keeping processing elements or applications alive. I/O devices are usually only addressed by the use of redundant controllers or shared buses. This only provide; HA access to a device in the event of a device failure. For example, using two ethernet controllers to provide a reliable ethernet connection. The driver and upper software layers can switch to the remaining good ethernet controller in the event that one of the controllers fails. However, in recent years, the leading cause of system failures has shifted from hardware failures to software failures, such as operating system panics or hangs. The mean time between failures for devices continues to increase as component count is reduced allowing cleaner and more reliable devices to be built. Therefore, addressing HA access to I/O devices in the event of failures other than the device itself is an area for research. The goal of this invention is to define a way in which access to devices can be preserved in spite of operating system or processing entity failures without requiring the users or applications to have any knowledge of the failure or recovery.

Fault tolerant and highly available computer system architectures range from simple hot-standby arrangements to complex architectures which employ dedicated fault tolerant hardware and hardened operating systems. The latter systems are most effective in providing availability since they have been designed with the goal to survive any single point of hardware failure. However, the system component replication of this hardware architecture has a price premium associated with it. For example, to ensure processor instruction integrity, three CPUs can be used in a triple modular redundancy (TMR) relationship to form one logical CPU. Before each instruction, the CPUs submit the instruction they intend to execute to a voter. If all three instructions are the same, the voter allows the instruction to be executed, if they are not, the odd one is voted out of the TMR relationship. While this ensures processor instruction integrity, it triples the cost of the CPU component. Even with the component replication, the FT architecture can still be susceptible to a single point of failure: the operating system. If the operating system panics or hangs, the entire machine is rendered useless in spite of the FT hardware. This is the case with all traditional bus-based, single node computer systems. If the operating system or the processing entity (CPU(s) and associated memory) fails, the entire system fails. As a result, the I/O devices associated with the system are no longer accessible.

This problem can be partially solved by employing the use of a distributed operating system and the concept of clustering. A distributed operating system allows a collection of independent computer systems to be connected together via a communication interconnect forming a cluster which car operate as a single system or as a collection of independent resources. This removes the operating system as the single point of failure. Since there are multiple instances of a cooperating operating system, the loss of one instance does not imply the loss of the collective system. In other words, each node is an independent fault zone. In this situation, the loss of a node as the result of a processing entity or OS failure only results in the loss of access to the devices which were attached to and being controlled by that node. This architecture can be exploited to provide more availability than the first case by attaching redundant controllers to different nodes in the group. These redundant controllers are attached to a common, shared resource. For example, consider a shared small computer system interface (SCSI) bus. Two nodes in the cluster each have a SCSI controller attached to a common, shared SCSI bus. If one of the nodes dies, the SCSI devices on that bus can still be accessed via the surviving node and its controller. While this allows a certain degree of device availability in spite of OS failures, it requires redundant controllers with shared resources. Devices and resources which do not support sharing cannot be addressed with this model.

Single system image (SSI) distributed operating systems allow a group of independent nodes to be clustered together and act as a single system. An SSI distributed operating system gives the illusion that physical machine boundaries are erased. This allows the user to access remote resources as if they were local. In addition, users can execute remote programs using local execution semantics. From the outside, the cluster appears to users as if it is a single computing resource. From the inside, the cluster appears to processes as if it is a single computing resource. As a result, devices in the cluster will appear as if they are independent of any particular node. In reality, this is not the case, it is just an illusion provided by the SSI distributed OS. However, the illusion can be exploited to help hide the loss of a node, and thus devices, from the user. In order for all devices to remain physically available in spite of an operating system failure, I/O devices must reside in a different fault zone than the processing entities. By having processing entities and I/O devices in different fault zones, the loss of the processing entity due to a hardware or operating system failure does not imply the loss of the I/O devices. This separation of fault zones is possible with a system area network (SAN) based system architecture. A SAN-based system is fully interconnected and allows any-to-any (CPU-to-CPU, CPU-to-I/O, I/O-to-I/O) communication between the components that make up the system. Unlike traditional bus-based system architectures, SAN-based systems allow I/O devices to be physically independent of any particular processing entity. As a result, from a hardware perspective, a device can be accessed by any of the processing entities, not just the processing entity that it shares a back-plane with as in the traditional bus-based system architecture. The loss of a processing entity does not preclude access to the devices that it was controlling. The I/O devices are still functional and accessible. In the event of an operating system or processing entity failure, the devices being controlled by that instance of the operating system should be transparently failed over to be controlled by some other instance of the operating system on a different processing entity in the cluster.

The SAN-based system architecture provides the framework for physical device access to remain intact in spite of an operating system or processing entity failure. However, transparently handling the failure and fail-over at the operating system level involves a multitude of operations not provided by the hardware architecture or the distributed operating system, SSI or not. From a software perspective, devices are still tightly coupled to a particular processing entity since the device driver that controls the device resides in a particular instance of the operating system on a processing entity. All system and user requests for the device must pass through the device driver before going to the device. Likewise, any data coming from the device must pass through the device driver before being returned to the system or user. Any requests for that device from anywhere in the cluster will have to come to that node and go through its device driver. Since device drivers are part of the operating system, when an operating system or processing entity fails, the device drivers on that processing entity are lost as well. Therefore, the software control for that device is lost. The SAN-based architecture provides a physical path by which the device can still be accessed. The distributed operating system allows the collective system to still be alive although a node in its collective has failed. However, all requests active on the device or in transit to the device at the time the processing entity failed will now be lost or return in error since the controlling entity (device driver in the OS) for the device is no longer available. Thus, while the SAN-based system provides the physical connectivity, and the distributed OS keeps the OS from being a single point of failure for the collective system, nothing is available to recover the device and make use of it.

Thus, it can be seen that there is a need to define a way in which access to devices can be transparently recovered, that is, rebuilding the internal system software framework to allow some other node in the cluster to assume the role of the controlling entity for the device in such a way that users and applications are not aware that a failure occurred. This has many implications. For instance, the device's state must be preserved so it looks exactly the same as it did, before the failure. The device driver on the new controlling node must have the same state information and be able to process requests in the same manner as the device driver on the failed node. The way in which the user accesses the device must remain exactly the same although the user's requests now have to go to a different node in the cluster. Any requests in transit or on the device at the time of the failure must be analyzed and replayed if necessary. All this and more needs to take place transparently. The combination of the SAN-based system architecture and an SSI distributed operating system provides the basic framework on which a solution for high availability access to I/O devices can be built.

However, even though the operation of a failed node may be taken over by another node of the cluster, the resources (i.e., peripheral devices connected to and controlled by the failed node) are often lost. The controlling entity (i.e., the CPU, its memory, operating system and device drivers) of the device has failed, but the device itself is still functional. Access to these devices may be critical and loss of access may be highly undesirable. For example, the availability of the processor unit in a web server is inconsequential if the disk controller or network interface cannot be accessed. It is desirable, therefore, that in the event of a node failure, access to the devices controlled by that node be transferred to another node.

SUMMARY OF THE INVENTION

Figure 1:
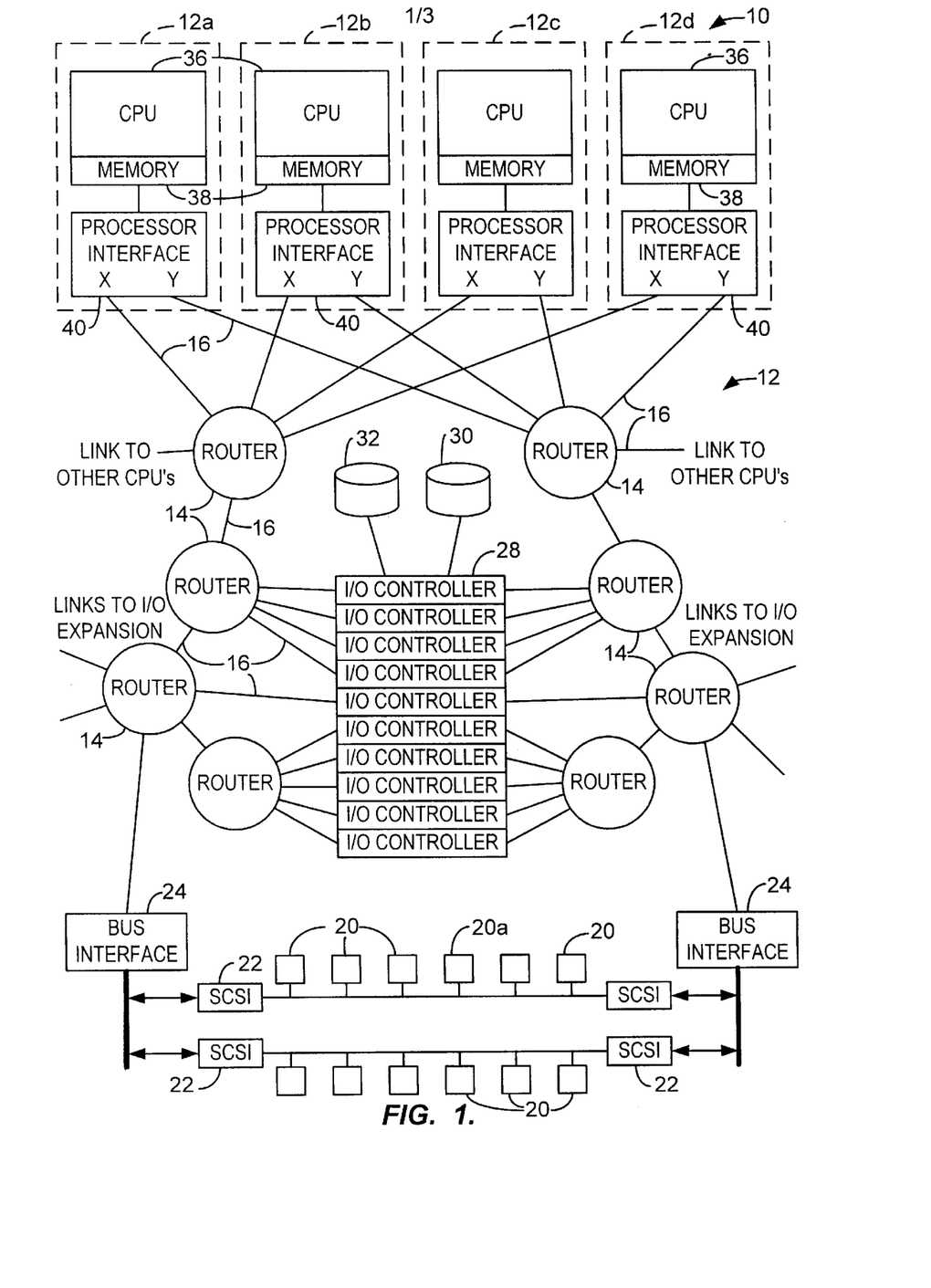
FIG. 1 is an illustration of a system cluster using a system area network (SAN) that provides point-to-point, communicative connection between the processors of the cluster and each of the I/O devices.

The present invention takes advantage of a recently developed multiple processor architecture, more particularly shown in FIG. 1, comprising a number of central processing units (CPUs) or nodes interconnected by a system wide network (SAN) to form a cluster in which any node of the cluster has access to any input/output unit or device. A more complete description of the architecture can be found in U.S. Pat. No. 5,675,807, the disclosure of which is incorporated herein by reference to the extent necessary.

Given this architecture and environment, the invention involves designating one of the CPUs as a device ownership information service (DOIS) server node and the keeper of a device ownership information table. The content of the device ownership information table provides the details of the "ownership" of each input/output (I/O) device, i.e., which CPU has the necessary driver or drivers and facilities for control of the I/O device, and what other CPU in the cluster also has such driver or drivers for the I/O device in the event the present "owner" CPU should fail. Nodes making first-time access to an I/O device will have the access request routed to the DOIS server node which will respond with data identifying the location of the desired device, i.e., the identification of the owner node of the I/O device. This information will by cached locally (at the requesting CPU or node) so that future requests can locate the desired device quicker—without having to go to the DOIS server node with a request.

Should the node controlling a device fail, that failure will be detected by a cluster membership service (CLMS) that runs on all nodes of the cluster, and the DOIS server node is apprised of that failure. The DOIS server node will then take steps to flush all references to the I/O device or I/O devices owned by the failed node, and attempt to re-establish ownership of the device by another node of the cluster having the necessary driver or drivers for active control of the I/O device. The device ownership table is then revised to reflect the device's new owner.

A primary advantage of the present invention is that when a CPU or node having controlling ownership of an I/O device fails, that failure does not cause the I/O device, or the resources it provides, to also be lost as has been the situation in the past.

The present invention focusses on addressing a specific opportunity to provide high availability access to the input/output devices of a cluster.

DESCRIPTION OF THE PREFERRED EMBODIMENT

A preferred embodiment of the invention uses a distributed operating system to allow a collection of independent processor units, referred to as nodes, to be connected via a communication interconnect, thus forming a "cluster" that is capable of operating as a single system or as a collection of independent processing resources. The takeover of services from a failed node by another node is an aspect of certain distributed operating systems. With this approach, the system as a whole can still function even with the loss of one or more of the nodes that make up the system.

An extension or enhancement to various operating systems, such as UnixWare 2.1, is Transparent Network Computing (TNC). (Aspects of TNC are described in the papers listed in Appendix A hereto.) TNC provides a single system image (SKI) clustering environment with historical ties to the Transparent Computing Facility (TCF) in the IBM AIX operating system for PS/2 and IBM 370 systems. (A more complete discussion of TCF can be found in "Distributed UNIX Transparency: Goals, Benefits, and the TCF Example," by B. J. Walker, and J. Popek; *Proceedings of the Winter* 1989 *Uniforum Conference*.) TCF had several limitations and was replaced by TNC. Early versions of TNC appeared in the OSF/I AD kernel for the Intel Paragon system. The latest versions of TNC are now available for UNIX SVR4.0, UNIX SVR4.2 ES/MP, and UnixWare 2.1.1, available from Tandem Computers Incorporated, Cupertino, Calif., and identified as "Non-Stop Clusters for SCO UnixWare," a SSI clustering technology (hereinafter, "NSC"). TNC, as incorporated in the NSC product, allows a collection of independent machines to be connected together via a communication interconnect, forming a cluster which appears to the user as a single system. The physical machine boundaries are erased, allowing the user to access remote resources as if they were local. In addition, users can execute programs on any node within the cluster using local execution semantics.

The present invention operates preferably using the TNC distributed computing system in a cluster arrangement to form a parallel or distributed system that consists of a collection of interconnected independent processor units that are utilized as a single, unified computing resource. A preferred cluster architecture is illustrated generally in FIG. 1, and designated with the reference number 10. As mentioned above, the architecture shown in FIG. 1 is described in greater detail in U.S. Pat. No. 5,675,807.

As FIG. 1 shows, a plurality of nodes 12 (12a, 12b, 12c, 12d, interconnected to one another and to various I/O devices by a SAN (designated generally with the reference numeral 11) formed from a number of multi-ported routers 14 and associated communicating links 16. The I/O devices include devices 20 which may be disk systems, printers, or other I/C) devices, that connect to the cluster 10 through small computer system interface (SCSI) controllers 22 and SCSI bus interface units 24. In addition, I/O controllers 28 may, in turn, communicatively connect disk storage devices 30 and 32 to the cluster 10.

Each node 12 broadly includes a central processing unit (CPU) 36, memory 38, and a processor interface 40 to connect the node 12 to the SAN. It will be appreciated by those skilled in this art that even though FIG. 1 shows each node as comprising one CPU, multiple CPUs could form a node. Also, it will similarly be appreciated that more nodes can be used. Only four nodes are shown here to reduce the complexity of the figure and discussion of that figure.

As indicated above, the cluster 10 will have installed the TNC-enhanced operating system. TNC is comprised of a set of processing layers and extensions that can be applied to standard operating systems, allowing a collection of independent processing units (nodes), such as nodes 12, to be connected together via a communication interconnect to form a cluster which appears to the user as a single system. To the user, the physical machine boundaries are erased so that access to remote resources appear as if they were local. In addition, users can execute programs on any node within the cluster using local execution semantics.

A TNC-enhanced standard operating system provides a full and complete kernel level single system image (SSI) as described above. From the outside, the cluster of nodes appears as a single computing resource. From the inside, a process sees the cluster of nodes as a single computing resource To accomplish the SSI illusion, TNC provides a single process id (pid) name space, a transparent distributed file system with a single file system name space, transparent remote process execution and process migration, cluster-wide UNIX interprocess communication, and transparent distributed remote device support.

While TNC provides a variety of useful services, those pertinent to a preferred implementation of the present invention are a distributed lock (DLM) management subsystem and the transparent distributed remote device support. For the most part the DLM is conventional insofar as is pertinent herein. A more detailed description of these features will be given.

To support transparent distributed processing, TNC uses a vproc layer. The vproc layer provides an abstraction layer much like that of the vnode layer for file systems. The vproc restructuring allows the base kernel code to do operations on processes without knowing or caring where the process is executing. The vproc operations support all the standard process interaction. For example, a parent and child relationship can exist between two processes even though the two processes are executing on two different nodes in the cluster. All interprocess communication is transparently supported.

TNC also supports a remote exec() and remote fork(). Both function like the standard UNIX exec() and fork() procedures except that a destination argument is provided so that the process can be started on some other node in the cluster. Two interfaces are provided for process migration, the migrate() system call and the SIGMIGRATE signal. The migrate() system call migrates the caller to the destination node passed to it in an argument. The SIGMIGRATE signal acts like any other signal. A process or process group can choose how to handle the receipt of the signal.

By default, processes in TNC can be migrated to other nodes in the cluster. These remote processing mechanism allow for load leveling. If a node in the cluster is overloaded, processes can be transparently migrated to other, less busy nodes in the cluster. Obviously, if a process migrates to another node in the cluster, there can be no processes on the destination node with the same process id. TNC addresses this problem by providing a single process id name space. Processes can be created on any node in the cluster and each will receive a unique process id. Furthermore, if a process migrates to another node in the cluster, all the resources it was using on the originating node must be visible on the destination node. That is, if the process was writing to a file, it must still be able to access that file after it migrates. If the process was accessing a device, it must still be able to access that device. Thus, TNC provides a transparent distributed file system and transparent distributed access to devices. In addition, TNC provides transparent distributed virtual memory and transparent distributed interprocess communication both of which allow single site semantics and guarantee coherency.

Much like distributed processing, the transparent distributed file system provides a single name space. A pathname addressed from any node in the cluster must resolve to the same file as it would from any other node in the cluster. All files in the file system must have single site semantics, including atomicity rules, unlinked open file rules, inherited file offset and flag rules, append mode rules, mandatory locking rules, and mapped file rules. Any mount of a file system on a node in the cluster must be visible to all other nodes in the cluster. Much of this processing relies on the DLM subsystem. For example, if two processes, a parent and a child, are executing on different nodes in the cluster and sharing an open file offset, coherency must be maintained between these two copies of the offset in order to provide single site semantics. The DLM subsystem is used to maintain this coherency. As will be seen, the DLM subsystem is employed by the present invention to maintain a coherent view of device ownership throughout the cluster. (The phrase "device ownership" refers to the node having the necessary device driver(s) necessary and for actively controlling an input/output device. Thus, for example, the I/O device 20a is said to be "owned" by node 12b because the process/driver used to access the disk system is available on that node. Similarly, the disk system 30 may be "owned" by the node 12d because the needed driver(s) reside and execute there. Node 12a, then, uses nodes 12b and 12d to access the disk systems 20a, 30, respectively.)

One of the node(s) 12 will be the primary node for ownership of each I/O of the cluster 10 device. Also, in accordance with the present invention, another of the nodes 12 will have the necessary driver(s) for the device, but for backup only. To continue the above example, and assuming that node 12b "owns" the I/O devices 20a and 30, this means that the driver(s) necessary for control of those devices will be resident and active in node 12b. For backup, however, assume that node 12a also has the necessary driver(s) for active control of the I/O device 20a while node 12d has the necessary driver(s) for the I/O device 30. If node 12b fails, ownership, according to the present invention, of the I/O devices 20a and 30 will be respectively switched to the nodes 12a and 12d and the drivers on those nodes for these devices made active. In that way, the failure of the node 12b does not include loss of the I/O devices it owns.

Thus, according to the present invention, there will be at least two nodes 12 having the necessary drivers for any I/O device of the cluster, one primary, the other for backup.

TNC, in turn, is structured to run with a UNIX operating system. Devices in UNIX are handled as special files. Special files include all file types in the file system except for regular files and directories. A pipe would be an example of a special file. Special UNIX file systems include specfs, fifofs, procfs, namefs, and fdfs. TNC provides mechanisms to allow all of the special files and special file systems to be accessed from any node in the cluster with local execution semantics. Access to remote special files in TNC is accomplished much in the same way as access to remote files in the cluster file system. A distribution/coherency layer is added above the existing single site code and most of the base OS code is left alone.

The file system of interest for the present invention is specfs. specfs is a file system layer that sits above the (I/O device) device driver(s) to provide a common interface to device files regardless of what physical file system they actually reside in. It also allows the operating system kernel to synchronize access to device special files. To allow special files, and thus devices, to be accessed from any node in the cluster with local execution semantics, TNC layers another file system above the specfs layer. This cluster special file system, or acspecfs, intercepts requests to device special files, determines the node in the cluster where the device associated with the device special file is being controlled, and routes the request to that node. On that nodle, the request is dropped through to the specfs layer where it is processed as a local request (i.e., sent on to the appropriate device driver). The result of the request is routed back to the calling process. cspecfs itself does not have any fail-over support in the event that a node which controls; a device goes down. It only provides the device transparency. The fail-over support for devices will be provided by the present invention.

As indicated above, TNC allows transparent access to devices attached to any node within the cluster 10 (FIG. 1), in turn providing a greater degree of resource sharing; any node 12 in the cluster has access to any device "owned" by any other node 12 as if the device were local to (i.e., owned by) the requesting node. In addition, TNC allows processes with devices open, to migrate throughout the cluster and still maintain access to those devices. On most hardware platforms, if a node in the cluster fails, the devices physically connected to that node would no longer be available to the other nodes in the cluster. However, as a result of architecture of the system shown in FIG. 1 in conjunction with the present invention, even though a node is down, the devices associated with that node can still be accessed. The present invention will provide mechanisms so that in the event of a node failure, an alternate path to the devices owned by the failed node will be established and used to continue to provide access to those devices by transferring ownership of the device(s) of the failed node to another node of the cluster.

The general goal of the invention is to allow all devices to be accessible even if there is a failure of a node in terms of a hardware failure (e.g., the CPU of a node fails) or software failure (e.g., the operating system panics). The ideal situation would be where applications with devices open would remain unaware of the fact that a node failed and that a new node is processing requests for devices they have open.

As described above, TNC allows a process on any node to make a request of a device regardless of whether that device is physically connected to or owned by the node 12 on which the requesting process is executing. This is accomplished by layering an additional processing layer above the current specfs file system of the standard operating system (e.g., UNIX), called cspecfs (cluster special file system). In addition, device special files in the /dev directory are created with additional information stored in their major/minor numbers. The number of the node that the device is physically attached to is encoded into extra bits of the major/minor device number.

When a request for a device is issued, cspecfs looks at the device number stored in the request to determine where the device of the request is destined or actually resides. cspecfs then routes the request to the correct node; the node where the device that the request is for is physically attached. Upon completion of the request, the result is routed back to the calling process.

The invention makes use of the general design of TNC, as described above. And, the architecture shown in FIG. 1 provides more flexibility in the routing of requests and the ability to separate nodes from devices. These additional capabilities are advantageous to implementing the present invention. A device can now be addressed from multiple paths. Therefore, the devices can be thought of as being independent of any particular node 12 in that if the node that is currently controlling them fails, another node can take over and continue to provide access.

In a preferred embodiment of the invention, as mentioned above, each I/O device of the cluster 10 will have a primary and secondary node 12 capable of ownership. In the example above, node 12b was the primary node for the I/O device 20a and node 12a was the secondary node for that device. In normal operation, the primary node will be servicing requests for the device. In the event that the primary node fails, the secondary node will take over control of the I/O device to continue to provide access to it. Since the devices are independent of any particular node and in the event of a failure of the primary node, a new node can take over control of the device, the device special file entries in the /dev directory cannot contain the node id of the node where the device is physically attached, as in the TNC case. Therefore, other methods of determining the destination of a request will have to be implemented.

Preferably, the device driver(s) for control of a given I/O device will be installed in the kernels of the primary owner node 12 and the backup owner node 12 for that device. There should not have to be attempts to dynamically load a device driver on a backup node when the primary node fails. Thus, if node 12b is the primary node for ownership of the I/O device 20a, the kernel running on node 12b will preferably include the device driver(s) necessary. If node 12a is the backup owner for the I/O device 20a, then it too will have device driver(s) associated with a part of the kernel. Similarly, if node 12a is also the backup owner for the disk system 32 (whose primary owner is node 12d), then node 12a will also have the necessary device driver(s) for that device.

Running on each of the nodes 12 (FIG. 1) is a cluster membership service (CLMS) which, among its other duties not relevant here, is the responsibility of determining node or service failures. It is the central location for decisions of whether a node is to be declared failed or not. It is also the service that must be communicated with when a node wants to join the cluster 10 to ensure that the joining node plays by the rules. The CLMS implements an "I'm Alive" protocol with the members of the cluster in order to determine the health and well-being of cluster members.

The "I'm Alive" protocol involves message traffic between the nodes that includes each node periodically broadcasting an "I'm Alive" message for receipt by all the nodes of the cluster, including itself, informing the other nodes that the broadcasting node is still functioning. When a node fails, that failure will be announced and identified by the absence of the failed node's periodic "I'm Alive" message.

The CLMS provides a conventional programmatic interface to allow other services to register with the CLMS to be informed of events such as a node failure. In connection with the present invention, the DOIS is such a service. Once registered with the CLMS, if a node is detected as being suspect and/or failed, the CLMS will notify those services that have registered with it to be notified of node faults. When the DOIS receives that notification it will begin the operations that will switch ownership of those I/O devices owned by the failed/faulty node to the nodes having the backup drivers.

As mentioned earlier, since the devices will be independent of any particular node 12 and in the event of a failure of the primary owner node for any device or devices, a new node 12 (the backup owner) can take over ownership of the device. For this takeover operation, the device ownership information service (DOIS) is provided. This service will provide those nodes (actually, its "clients" executing on a node) with ownership information about a given device. Preferably, this service must provide a consistent view of the ownership of devices throughout the cluster.

The DOIS includes two main modules. One is a "local" or "client" DOIS that runs on all nodes 12 of the cluster; the other is a "server" module that runs on only one of the nodes 12. The node 12 that serves as the DOIS server node provides information as to I/O device ownership in a manner described below. Requests for the location of an I/O device, i.e., what node 12 of the cluster 10 has ownership of the device, will be made at the requesting node to the local DOIS module of that node. The local DOIS module will then forward that request to the server DOIS module.

Requests for access to a device will be routed and processed via the existing TNC cspecfs mechanisms. The cspecfs layer is modified to use the device ownership information service to determine the destination of a request and route the request to that node. The request will be sent to the target node via the SAN (FIG. 1). Once the request reaches its destination, it will be processed as a local request. The result of the request will be copied back to the node originating the request, which in turn will respond back to the calling process. For example, suppose a process running on node 12a wants to write to the I/O device 22a which is owned by the node 12b. That write request will be routed to the node 12b, and treated there as a local request. The data of the request will be handled by node 12b as if it came from a process running on the node 12b and accordingly written to the I/O device 20a. Any responses prompted by that write operation will be returned to the node 12a and to the process that requested the write operation.

As discussed, Transparent Network Computing (TNC) provides transparent access to any device in a cluster from any node in the cluster (FIG. 1) by layering a cluster special file system, cspecfs, above the standard UNIX (e.g., UNIX SVR4.2) file system for device special files, e.g., specfs. When a request is made for an I/O device of the cluster 10, the first issue is to determine which node in the cluster owns that device. Heretofore, locating the device server node has been accomplished in a number of ways. For example, the node number or identification (id) of the server node has been encoded in the device number that identifies the I/O device. When a request is issued for the device, cspecfs has pulled the node id out of the device number of the request and route the request to that node for processing. An alternative approach has been to add additional fields to the inode associated with the device node. (An inode is an internal data structure used by UNIX to represent files on disk. It controls/maintains file permissions, reference counts, and the like.) The device ownership information could be added to the inode as it is created as part of the process of creating the device node. When the device node is accessed, the inode is looked up as part of the standard processing.

Once it is found, the ownership information can be extracted. As part of standard processing, on-disk inodes are cached in memory, this would then allow quicker owner determination the next time a device is accessed. The other method is to build a single global device table at boot or configuration time. This table can then be used to route requests to the controlling node for the device.

Since the present invention preferably allows for primary and secondary owner (device server) nodes, the first method will not work. The second method similarly is not applicable since a modification to the inode would result in changes to the physical file system and on-disk image. This would make the file system non-standard and introduce compatibility problems with other systems. Therefore, device ownership information will need to be obtained from a different source, such as a global device table, for the present invention.

Figure 2:
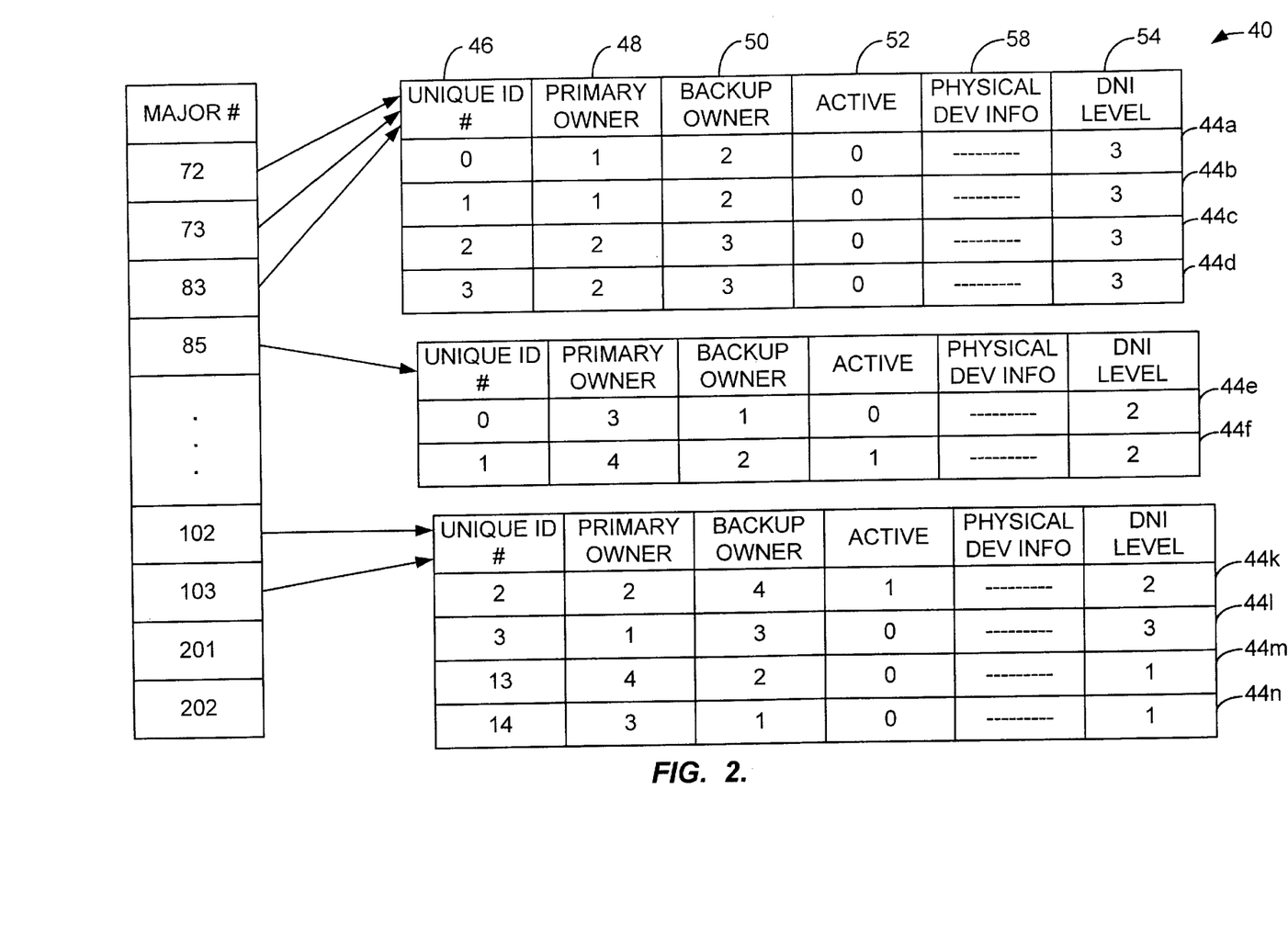
FIG. 2 shows the structure of data in the device ownership information table.

According to the present invention, therefore, one of the nodes 12 (e.g., node 12c) will be designated the device ownership information (DOIS) server with the responsibility for maintaining a device ownership information table ("device database") that identifies the ownership of all the I/O devices in the cluster 10, i.e., which nodes 12 have active control of which I/O devices. (The device ownership information table is shown in FIG. 2, and described further below.) Node 12c will have resident, therefore, both DOIS modules: the local DOIS module and the server DOIS module which will maintain and use the device ownership information table. The node id for the elected DOIS node 12c will be stored in an agreed upon file in the file system so that other nodes can determine which node 12 in the cluster 10 is providing the ownership information service. The DOIS server node 12c will have a backup node (e.g., node 12a) that will take over the service the DOIS node 12c provides in the event that it (node 12c) fails. (I.e., the DOIS backup node will, in addition to the local DOIS module, also have resident a server DOIS module, albeit in an inactive state.) Preferably, the device ownership information table will be kept in memory for speed of access and stored on a mirrored disk partition (e.g., disk system 30) for robustness and fault tolerance. The device ownership information table is constructed at startup or "boot" time from information either supplied by a service processor (not shown) and/or information supplied by a system administrator and stored in configuration files during system configuration as is conventional.

Care must be taken to ensure that unique device names and numbers are created. Typically, device names are chosen to give the user an idea of the physical location and type of the device. For instance, a device name of /dev/dsk/c0t4d0p0s3 might refer to small computer system interface (SCSI) controller 0, SCSI target ID 4, Logical Unit Number (LJN) 0, partition 0, slice 3. The device number typically contains the same type of information encoded into the bits that make up the device number. A device number (dev_t) is 32-bits long and divided into a major number (14 bits) and a minor number (18 bits). The major number specifies the type of the device and is typically used as an index into device switch tables (cdevsw, bdevsw) to determine which device driver to access. The minor number is device driver specific and is used by the device driver to determine such things as controller number, partition numbers, port numbers, and so on.

In the present invention, the 14-bit major number is used by the DOIS as an index into the device ownership information table which is illustrated in FIG. 2. Thus, as FIG. 2 slhows, the device ownership information table, designated generally in FIG. 2 with the reference numeral 40, comprises a plurality of entries 44 (44a, 44b, . . . , 44n). There is an entry 44 for each I/O device in the cluster 10, and the 18-bit minor number of the device number serves as the index into the device information table for the specific entry 44 for the device. Pertinent to the present invention are five fields of each entry: an identification field 46 which uniquely identifies the I/O device; a primary owner field 48, identifying the primary node having active control of the I/O device by a node identification; a backup owner field 50, identifying the node having the necessary driver(s) and capable of taking over active control of the particular I/O device should the primary owner fail; an "active" field 52, identifying which node (active or backup) presently has active control of the I/O device, and a DNI level field 54. The DNI field 54 provides information for the particular drive for use when the node 12 controlling the device fails, and active control is moved to the backup node 12. As will be discussed further below, a switch of active control of a device from a failed node to its backup node can be one of three levels: transparent (to the "clients" or processes that use or are using the I/O device), non-transparent, or transparent in some situations (i.e., a switch by a system administrator) and non-transparent in other situations (i.e., a switch resulting from the failure of the node then actively controlling the device). This information is used by the device driver(s) to handle requests outstanding or made while the switch of active control from one node to another is being made.

The entries 44 also have other fields, such as the physical device information field 58 that provides additional information about the corresponding device that is not needed for operation of the present invention.

FIG. 2 illustrates the 14-bit major number portion of the device name for each device being used as the index into the device ownership information table 40 for the entry corresponding to the particular I/O device. However, since, as noted above, the major number specifies the type of the device, and since the cluster 10 may well have a number of devices of the same type, a major number most likely will point to a block of the entries 44 that contain entries pertaining to that same type. There will only be one block of entries 44 pertaining to a single device type. For example, the major numbers 72, 73, and 74 could all be a SCSI device type (e.g., disk, tape, CD-ROM), and all point to the block of entries 44 (44a, 44b, . . . , 44d) that are of the same type.

The device ownership information table is constructed by running a cluster configuration utility when the cluster 10 is brought up (on-line) for the first time, and any time a new node, controller or I/O device is added to the cluster, or whenever a system administrator wishes to change which node is controlling a device. (As is conventional, provision is made for a system administrator, i.e., a person, to modify, add, delete certain system characteristics. For example, an I/O device may need to be removed or added, requiring their identities to be removed or added. Also, a node may need to be removed, and the I/O devices that were actively controlled by that node switched to the backup node—at the request of the system administrator.) Preferably, the utility starts with hardware resource inventory that may be created, for example, by a maintenance diagnostic system during system boot, and this inventory information used for (among other things) the device information table.

After the device ownership information table is constructed, the DOIS server code 66 will go through the table, entry by entry, and ask the DOIS server DLM code to create an object for that entry which is stored in an object data structure 72 (containing all objects for all entries) that is maintained by the DOIS server DLM code 68. Although the object can contain varied information pertaining to the entry (e.g., a handle that uniquely identifies the object, tokens, locks, etc.), pertinent here is that the object will contain the identification of the node 12 that has ownership and control over the corresponding I/O device.

Figure 3:
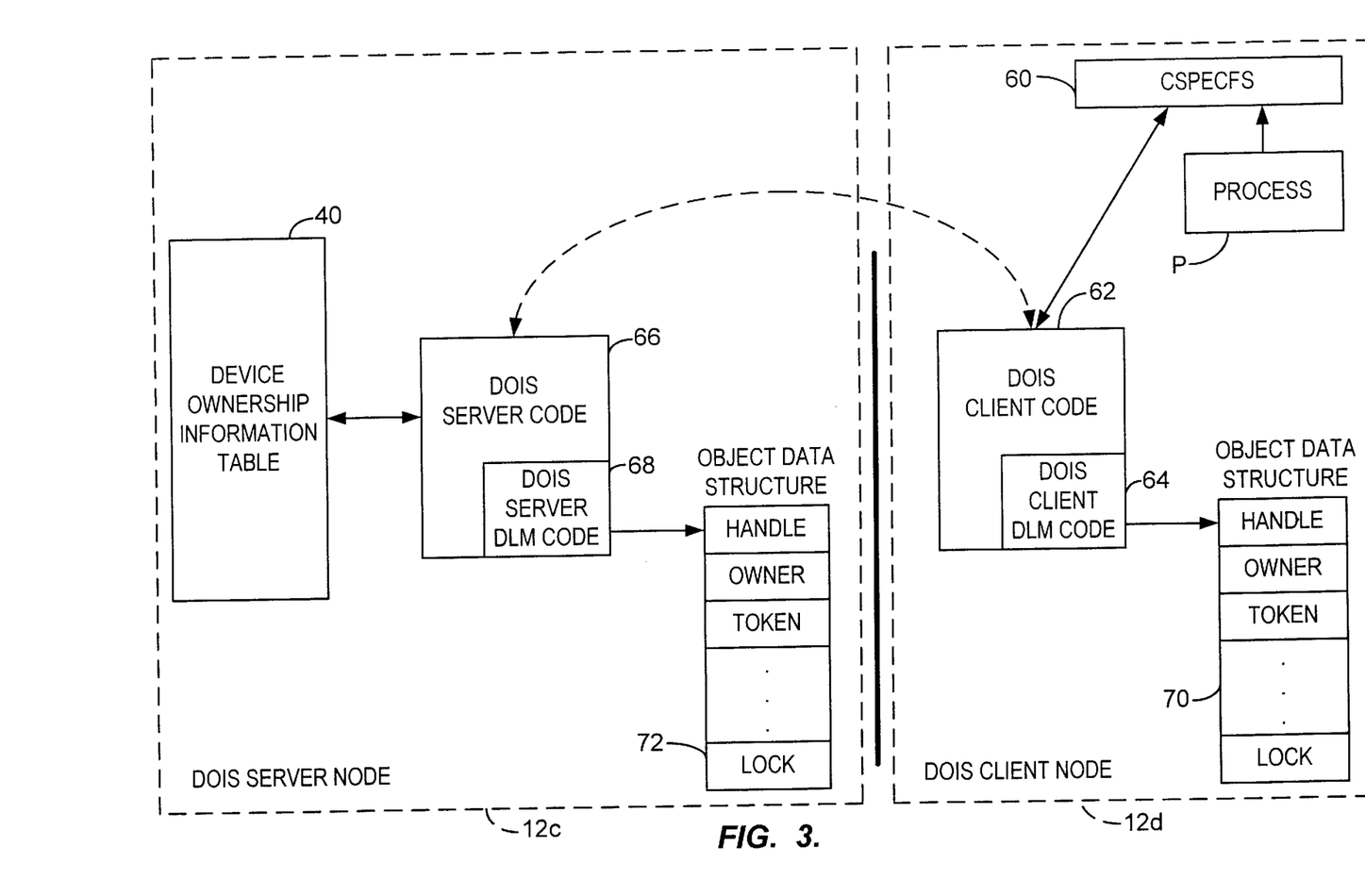
FIG. 3 illustrates the architecture of the device ownership information service employed in the present invention.

FIG. 3 illustrates operation of DOIS, and its use of the device ownership information table 40 of FIG. 2. Assume that a process P running on node 12d wishes, for the first time, to read data from or write data to an I/O device. That request will be routed to the cspecfs layer 60. When that request, cspecfs will send information from the device number (dev_t) out of the request to the DOIS client code 62 (i.e., the local DOIS module) which will, through its local distributed lock management (DLM) code 64, check to see if the information is cached locally at 70 (an object data structure for holding, locally, device ownership information). Since this is the first request, it will not be, so the DOIS client DLM code 62 will send a message to the DOIS server DLM code 68 on the DOIS server node 12c to get the device ownership information (that was previously provided to the DLM server by the DOIS server) for the I/O device being addressed.

At the DOIS server node 12c, the DOIS server DLM code 68 will receive the request. The DOIS server DLM code 68 will access the device information stored in the DLM server's object data structure 72 for the device ownership information pertaining to the request, and send a return message to the node 12d containing the lock (e.g., a read lock in this instance) and the device ownership information.

For example, assume that the process P executing on the node 12d issues a request to access a particular peripheral I/O device (e.g., disk system 32; FIG. 1). The request will contain an identification of the I/O device, and will invoke a function call from the cspecfs layer 60, as described above, to the device number (dev_t) in the request to produce an id number that is first used by the DOIS client code 62 to determine if needed device information concerning the device addressed in the request has been cached locally or not. If so, the information, which will include all the lock management data and other fields from the device ownership information table, will be accessed to obtain therefrom the node id of the node 12 having control of the device being accesses in the request that is being processed.

If the needed device ownership information is not cached locally, it must be obtained from the DOIS server node 12c (i.e., the server DLM code 68) in the manner described above. Once the DLM server node 12c responds with the ownership information, the DOIS client code 62 at the requesting node 12d will route that information to the cspecfs.

This process of always going to the DLM server node 12c for device ownership information could impose unacceptable delays if each request arriving at cspecfs had to wait for cspecfs to communicate with the DOIS server node 12c to determine which node 12 of the cluster owned (controlled) the requested device. Therefore, according to a preferred implementation of the invention, when the requested device ownership information is received back from the DLM server node 12c by a requesting node 12, here, node 12d, that information will be cached locally in the data structure 70 by the DLM client code 64. All subsequent requests for the same device will have each node first looking to its local cache 70 for the ownership information for a requested device before going to the DLM server node 12c for that information. If the device is found in the local cache 70 of the requesting node 12, the request can be routed to the proper owner (controlling) node without any communication with the DLM server node 12c. In the event the device ownership information for a particular device changes, all the nodes 12 of the cluster 10 that have that information cached locally will be informed to remove the cached entry for the device. This is a problem that is preferably addressed by the DLM code.

Operation of the present invention to change ownership in the face of a node failure proceeds generally as follows. Carrying forward the assumption that node 12b is the primary owner of the I/O devices 22a and 30, and that the backup owners are nodes 12a (for the device 22a) and 12d (for the device 30), the entries 44 in the device ownership information table 40 for each of these two devices will have the primary and backup owner field 50 containing data that identify the nodes 12a and 12d. Assume further that some of the nodes (e.g., node 12d) has previously accessed files stored on the devices 22a and 30 and, therefore, have device ownership information stored locally in the data structure 70.

Now assume that node 12b fails, suffering either a hardware failure or a software failure, so that the CLMS detects that failure. Since the DOIS code 66 has registered with the CLMS, it will be notified of the failure of node 12c. The DOIS server code now knows that the devices 22a and 30 can no longer be accessed through the primary owner node of those devices, node 12b. Thus, ownership must be changed.

First, the DOIS server code 66 must "flush" the device ownership information in the other nodes since it is now invalid. For this purpose, the DLM server code 68 maintains a list of all nodes that have requested device ownership information and the devices of those requests. The DOIS server code will search the device information table for all entries 44 that list node 12c either as the primary owner or the backup owner of the devices 22a, and check the "active" field to determine which is the present owner. With these entries, the DOIS server code will then correlate the device ownership information for the failed node 12b with the list of nodes that have made requests for device ownership information about devices owned by the failed node, in this example, devices 22a and 30. From this correlation effort the DOIS server code 66 will find that at least node 12b has device ownership information. Accordingly, DOIS server code 66 gets write access to the DLM object representing the device from the DLM Eserver code 68. DLM server code 68 directs DLM client code 64 to invalidate its cached entry for the device. DLM server code 68 then grants write access to the DOIS serve code 66.

Next, the DOIS server code will initiate the necessary takeover of the devices by the backup nodes. This is a device and device driver specific operation. However, the DOIS server code will identify those nodes 12, from the entries 44, having the necessary backup driver(s) for control of the devices 22a and 30, and notify them that they are to perform a takeover operation of the particular device. Thus, the necessary driver code at node 12a will begin the operation to takeover the device 22a, and similarly the code at node 12d will initiate takeover of device 30. The takeover operations are discussed further below.

When the takeover of a device has completed, the DOIS server code 66 will make the appropriate changes to the entries 44 of the device ownership table 40, and make the corresponding changes to the DLM object representing the devices (and then release the write lock on the DLM object), pertaining to the devices 22a and 30 to identify their new owners: nodes 12a and 12d, respectively. Any requests for device ownership information received by the DOIS node 12c pertaining to the devices 22a and/or 30 will be stored, and responded to only after the entries have been changed.

The takeover of the device by the new owner can occur in a transparent manner or a non-transparent manner based on the functionality of the device and device driver being considered. Takeovers are automatically initiated by the DOIS server during failure scenarios. Takeovers can also be initiated by the system administrator for on-line configuration purposes. For example, an administrator may want to take down a node in the cluster for maintenance purposes. The administrator could initiate the takeover of devices on a node by the backup owner(s) for those devices. This would allow the administrator to potentially remove the node from the cluster without interrupting access to the devices that it was controlling prior to the takeover.

A non-transparent takeover means that applications will see the failure or owner change. That is, active and pending requests at the time of the failure will be lost or returned in error and the application will have to close and re-open the device. To an application, it will appear as if the device they were using went away and a new device returned in its place.

A transparent takeover means that applications will not see the failure or the owner change. Transparent on-line configuration changes are easier to support than transparent failures. This is because the configuration case is a controlled event. The status of the requests and the device can be brought to a known state before initiating the takeover, whereas, a failure can occur at any time without warning and thus, the status of the requests and the state of the device is unknown.

Transparent on-line configuration changes can be supported with two phases of processing. One phase is to manage the requests and the other to manage the existing device and driver state information. For the transparent on-line ownership change, it will be necessary to get the requests processed up to a known point and then delay further requests. This, in effect, prevents the state information in the driver and on the device from changing and also provides a known state for each request (i.e., it has either completely finished, or it has not started at all). For the transparent on-line ownership change, it is also necessary to stop activity on the device and in the driver in order to capture the state of the device and store it so that it can be restored after the ownership change. Once the state of the requests and the state of the device and driver have been captured, the device can be taken over by the backup node. The state information for the device and driver can be restored, and pending and new requests can start being processed. The application may see a slight delay as the takeover occurs, but it will not be aware that a new node is now servicing requests (acting as the owner) for the device it is accessing.

To transparently handle node failures, the same basic information as described for transparent configuration changes is necessary. That is, the status of requests and the state information from the device and device driver must be known. Since node failures are unpredictable and can occur at any time, the device driver must prepare itself and change its way of processing so that the device can be taken over in a transparent manner. In order for the node failure to be transparent, two things must occur. First, the device driver state, if any, needs to be re-established on the backup owner node. Secondly, the state of each request that did not complete has to be ascertained.

The state information kept in the device driver and/or on the device itself will have to be able to be collected by DNI at node failure time and restored on the new backup owner node. The state information can be stored off to a non-volatile location or mirrored to the backup owner node during the course of normal processing. Any updates to the state information can be reflected to the backup location. Other methods of saving and restoring the state information exist. The best method for a particular device must be decided by analyzing the characteristics of the device driver and the device.

Depending on whether the device driver and device supports idempotent or non-idempotent operations and synchronous or asynchronous transactions will determine the level of modifications to the device driver and system services. For synchronous, idempotent operations, handling the requests that were in progress when the failure occurred can be as simple as just retrying the requests. For non-idempotent and/or asynchronous requests, the device drivers and system services will have to be greatly modified to store state information about each request and the varying degree of completion of that request through the layers of the device driver and device. Once again, this is an area that is very device specific and the best method for handling the partially completed requests during a failure will have to be decided by analyzing the characteristics of the device driver and the device.

Each device driver will be modified to support a certain level of DNI based on its functionality and characteristics. The level of DNI that it supports is stored in the Device Ownership Information table so that the DOIS will know what to expect from the device in regards to failures and on-line configuration changes. This will allow the DOIS to take the appropriate action for that particular device's DNI level, such as returning errors to requests made after the node has gone down for DNI level 1 devices. The three levels of DNI are summarized below:

DNI Level 1:

Level 1 of DNI is an introductory level with non-transparent failures and non-transparent configuration changes. The main benefit of level 1 is that in the event of a node failure, devices controlled by that node will automatically be switched over to be controlled by the backup node for that device. While this switch is not transparent, it is automatic. Therefore, it requires no operator intervention.

DNI Level 2:

Level 2 of DNI is an intermediate level which begins to offer some transparency. Node failures are handled in the same non-transparent manner as they are in level 1 of DNI. What level 2 of DNI adds over level 1 is the ability to change the ownership of a device on-line. That is, if a device is being controlled by one node in the cluster, the administrator can change the control of the device to the backup node in the cluster without applications being aware of the change.

DNI Level 3:

Level 3 of DNI provides complete transparency in terms of node failures and ownership changes. The transparent on-line ownership changes for level 3 of DNI are handled in the same manner as they are for level 2 of DNI. The handling of transparency for the failures is device specific as mentioned above.

In summary, there has been disclosed a method and apparatus capable of recovering control and use of I/O devices that were controlled by processing nodes that encounter failures of one sort or another. It will appreciated by those skilled in this art, however, that although the invention has been disclosed in terms of a preferred embodiment and environment employing a UNIX operating system and the TNC extension for single system image operation, other operating systems may be used to employ the invention.

APPENDIX A

Lilienkamp, J., Walker, B. J., & Silva, R. (1993, July) Accessing Remote Special Files in a Distributed Computing Environment, Proceedings of the Second International Symposium on High Performance Distributed Computing, Spokane, Wash., 244–251

Popek, G., & Walker, B. J. (Eds.) (1985) The LOCUS Distributed System Architecture, Cambridge, Mass., The MIT Press Walker, E. J., Lilienkamp, J., & Hopfield, J. (1993) Open Single System Image Software for the Multicomputer or MPP (Massively Parallel Processor) Uniforum, March 1993

Walker, B. J., Zajcew, R., & Thiel, G. (1993) VPROCS: specfs A Process Abstraction to Enable Single System Image Distributed Computing [White Paper], Inglewood, Calif., Locus Computing Corporation

What is claimed is:

1. In a processing system including at least first and second processor nodes and an input/output device interconnected by a network for communication therebetween, the input/output device being actively controlled by driver software maintained by the first processor node, a method of switching active control of the input/output device from the first nodes to the second processor node, including the steps of:

maintaining in the second processor node additional driver software for active control of the input/output device;

maintaining a device ownership information for the input/output device that identifies the first processor node as having active control of the input/output device;

detecting failure of the first processor node; and changing the device ownership information for the input/output device to identify the second processor node as having active control of the input/output device.

2. The method of claim 1, including the step of accessing the input/output device through the first processor node using the driver software or, if failure of the first processor node is detected, accessing the input/output device through the second processor node using the additional software.

3. The method of claim 1, wherein the step of maintaining the device ownership information includes the step of maintaining the device ownership information in each of the first and second processor nodes.

4. An article of manufacture comprising a number of processor nodes and at least one input/output device accessible by the number of processor nodes, at least first and second ones of the number of processor nodes including a memory wherein is located a driver computer program and a backup driver computer program, respectively, for active control of the input/output device, each of the number of processor nodes having memory containing an application computer program causing the number of processor units to implement the steps of:

maintaining device ownership information for the input/output device that identifies the first processor node as having active control of the input/output device;

using the driver computer program and the first one of the processing nodes to use the input/output device;

detecting failure of the first processor node;

changing the device ownership information for the input/output device to identify the second processor node as having active control of the input/output device; and thereafter, using the backup driver computer program and second one of the number of processor nodes to use the input/output device.

5. In a computer system that includes a plurality of processors, including a first and a second processor, the processors being interconnected by a communication network with a number of input/output devices, including a first input/output device, a method of fault tolerant control of the first input/output device that includes the steps of:

maintaining active control of the first input/output device through driver software on the first processor;

identifying to the plurality of processors the first processor as having active control of the first input/output device;

maintaining backup driver software for controlling the first input/output device on the second processor;

the plurality of processors using the first input/output device through the driver software on the first processor;

detecting a fault of the first processor to identify to the plurality of processors the backup driver software as having active control of the first input/output device;

thereafter, the plurality of processors using the first input/output device through the backup driver software on the second processor.

6. The method of claim 5, including the step of maintaining on a selected one of the plurality of processors a list respectively identifying the first and second once the plurality of processors as having the driver and backup driver software.

7. The method of claim 6 including the step of the plurality of processors wishing to use the first input/output device receiving first from the selected one of the plurality of processors an identification of the first processor on which the driver software is maintained, and thereafter using the first input/output device through the first processor.

8. The method of claim 5, including the step of maintaining on a selected one of the plurality of processors a list identifying the first processor as maintaining driver software and the second processor as maintaining the backup driver software; the detecting step including the steps of deleting the identification of the first processor from the list and adding the identification of the second processor as having backup driver software for active control of the first input/output device.

9. The method of claim 8, including the step of the plurality of processors wishing to use the input/output device first receiving from the selected one of the plurality of processors an identification of the first processor on which the driver software is maintained, and thereafter using the input/output device through the first processor.

10. The method of claim 9, the detecting step including sending to the plurality of processors that have used the input/output device the identification of the second processor, and thereafter such plurality of processors using the input/output device through the second processor.

11. A method of providing fault-tolerant access and control of an input/output device communicatively coupled to a plurality of processors that includes the step of:

provided active control of the input/output device with driver software on a first one of the plurality of processors;

providing a second one of the plurality of processors with backup driver software for active control of the input/output device;

the plurality of processors wishing to use the input/output device receiving an identification of the first one of the plurality of processors to thereafter use the input/output device through the driver software and the first one of the plurality of processors;

detecting failure of the one of the plurality of processors; and the plurality of processors wishing to use the input/output device receiving an identification of the second one of the plurality of processors to thereafter use the input/output device through the backup driver software and the second one of the plurality of processors.

12. The method of claim 11, including a preselected one of the processor operating to maintain a list identifying the first and second processors.

13. The method of claim 11, including a preselected one of the processor operating to maintain a list identifying the first and second processors, and wherein the detecting step includes the step of the preselected one of the plurality of processors sending to the plurality of processors that used the input/output device through the driver software and the first processor the identification of the second processor having the backup driver software.

* * * * *